United States Patent [19]

Yoshino

[11] Patent Number: 4,815,750
[45] Date of Patent: Mar. 28, 1989

[54] METALLIC GASKET WITH SEALING BEADS
[75] Inventor: Nobuo Yoshino, Kumagaya, Japan
[73] Assignee: Nihon Metal Gasket Kabushiki Kaisha, Kumagaya, Japan
[21] Appl. No.: 204,189
[22] Filed: Jun. 8, 1988
[51] Int. Cl.[4] .............................................. F16J 15/08
[52] U.S. Cl. .................... 277/235 B; 277/236
[58] Field of Search ............... 277/166, 231–234, 277/235 R, 235 B, 236

[56] References Cited

U.S. PATENT DOCUMENTS

| 4,330,585 | 5/1982 | Eyrard et al. | 277/235 B |
| 4,400,000 | 8/1983 | Moerk | 277/166 |
| 4,591,170 | 5/1986 | Nakamura et al. | 277/235 B |
| 4,669,740 | 6/1987 | Schwenkel | 277/235 B |
| 4,688,809 | 8/1987 | Deppe | 277/236 |

Primary Examiner—Robert S. Ward
Attorney, Agent, or Firm—Flynn, Thiel, Boutell & Tanis

[57] ABSTRACT

A metallic gasket, such as for an internal combustion engine, wherein an elastic metallic plate has a pair of combustion chamber holes therethrough in adjacent relationship. Annular sealing beads are formed on the gasket in surrounding relationship to the combustion chamber holes. The beads are disposed closely adjacent so that they substantially overlap in the region between adjacent holes. At the junctions where the adjacent beads meet, the bead width is approximately equal to the bead width in the region between the junctions and in the remaining annular parts of the beads.

3 Claims, 1 Drawing Sheet

METALLIC GASKET WITH SEALING BEADS

FIELD OF THE INVENTION

The present invention relates to a metallic gasket and, in particular, to a metallic gasket capable of preventing a reduction in sealing pressure at a junction at which beads meet, thereby providing an effective sealing effect.

BACKGROUND OF THE INVENTION

It is known that a metallic gasket comprises an elastic metallic plate on which beads are formed, the joint surfaces of a jointed member being efficiently sealed by the beads. This metallic gasket is inserted between, for example, the joint surfaces of a cylinder head and a cylinder block of an internal combustion engine, and seal lines are formed on the joint surfaces by the tightening forces of bolts, thereby enabling sealing of portions to be sealed.

Such a metallic gasket is previously disclosed in, for example, Japanese Patent Application No. 57-81530 filed by the applicant of the present invention. The metallic gasket disclosed in this prior application includes beads each having a bead width sufficiently greater than its bead height and a base plate having surfaces which are covered with a sealing material or the like by surface treatment, the sealing being realized by a single base plate.

As shown in FIG. 3, a metallic gasket 2 of this conventional type is illustrated and includes beads 10 which are formed to surround individual combustion chamber holes 6 to be sealed. The beads 10 meet between adjacent ones of the combustion chamber holes 6, and often form a junction 12. At the junction 12, a plurality of beads 10 meet, with the result that a bead width $L_1$ at the junction 12 becomes greater than a bead width $L_2$ at a non-junction 14. Since, in this manner, the bead width is made greater than the bead height at the junction 12, the spring constant of the junction 12 becomes smaller than the spring constant of the non-junction 14. This causes a reduction in sealing pressure at the junction 12, thus resulting in various problems such as the non-uniformity of sealing pressure acting upon the joint surfaces.

For this reason, there is an instance wherein gas or oil leaks from a periphery of the junction 12 at which sealing pressure is weakened. In order to ensure the sealing property of the junction 12 at which sealing pressure is weakened, a great fastening force must be made to act upon this junction 12. As a result, an excessive fastening force acts upon the non-junction 14 and can cause cracks to be formed in the bead, and this raises the problem of a reduction in sealing property.

It is, therefore, an object of the present invention to provide a metallic gasket in which it is possible to eliminate or at least minimize the non-uniformity of sealing pressure acting upon a joint surface by the prevention of a reduction in sealing pressure at each junction at which sealing beads meet, thereby achieving more effective sealing.

To this end, in accordance with the present invention, there is provided a metallic gasket comprising an elastic metallic plate having beads formed thereon, the beads being formed on the elastic metallic plate so that the bead width at each junction at which each bead meet an adjacent bead may be made approximately equal to the bead width at each non-junction.

In accordance with the construction of the present invention, beads for sealing portions to be sealed are formed so that bead width at each junction may be made approximately equal to bead width at each non-junction. Therefore, the spring constant of each of the junctions does not become smaller than that of each of the non-junctions. Accordingly, it is possible to prevent a reduction in sealing pressure at the junctions and hence the occurrence of non-uniform sealing pressure.

DETAILED DESCRIPTION

Figure 1:
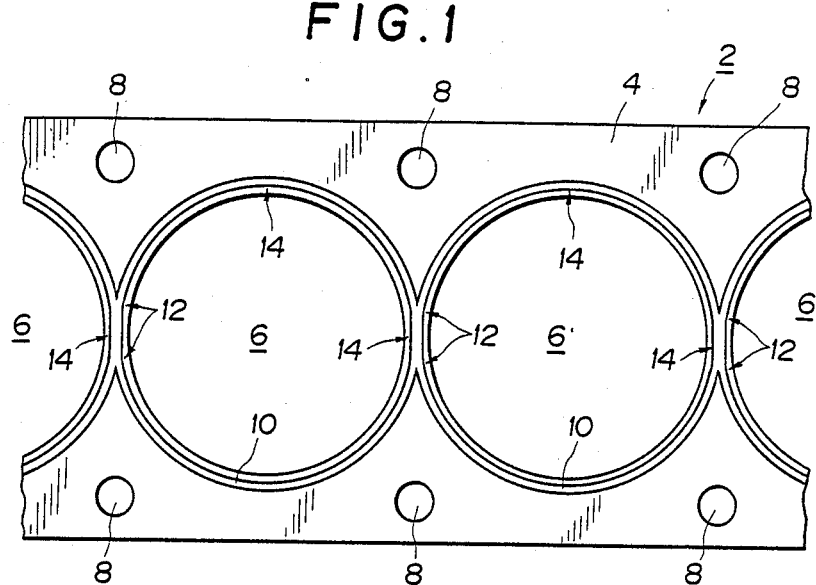
FIG. 1 is a plan view of a metallic gasket of the invention.
Figure 2:
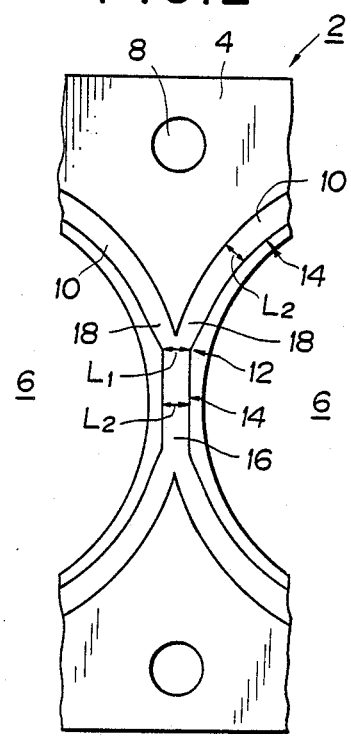
FIG. 2 is an enlarged plan view of the essential portion of the metallic gasket shown in FIG. 1.
Figure 3:
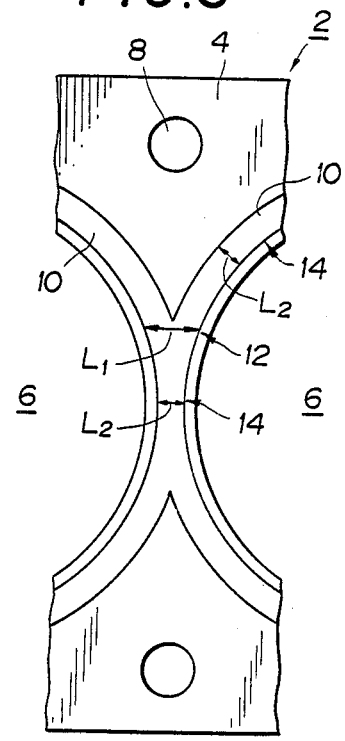
FIG. 3 is an enlarged plan view of the essential portion of a metallic gasket of a conventional type.

FIGS. 1 and 2 show an embodiment of the present invention. As illustrated, 2 designates a metallic gasket; 4 designates a base plate made from an elastic metallic plate; 6 designates combustion chamber holes; and 8 designates bolt holes. Annular beads 10 are formed on the base plate 4 in such a manner as to surround the respective combustion chamber holes 6.

Adjacent ones of the beads 10 meet and hence in effect overlap in the region between adjacent combustion chamber holes 6 to form junctions 12. As shown in FIG. 2, the bead width $L_1$ at each of the junctions 12 at which the beads 10 meet is made approximately equal to the bead width $L_2$ at each of the non-junctions 14. However, the bead width is progressively narrowed as the beads closely approach the junction 12 so that $L_1$ approximately equals $L_2$ may be achieved at the junction 12. The phrase "approximately equal to" used herein also means "the same as" and "about the same as."

Referencing FIG. 2, the gasket construction will be explained in greater detail. Specifically, the area where the adjacent beads 10 tend to effectively overlap hence creates the region 16 which is free of junctions, this non-junction region 16 comprising a part of each of the adjacent annular beads 10. According to the present invention, this non-junction region 16 is provided with a width $L_2$ which substantially or approximately equals the normal width $L_2$ of the non-overlapping parts of the beads 10. This overlapping non-junction region 16, at opposite ends thereof, terminates substantially at the junctions 12, the latter being generally Y-shaped in that the overlapping region 16 hence splits into two legs 18 which thus form part of the respective annular beads 10. The width of this junction 12, as measured at the apex of the Y-shaped configuration, that is directly at the point where the two legs 18 split into the separate annular beads, has a width $L_1$ which in this invention is substantially or approximately equal to $L_2$. To accomplish this, the legs 18 as they project away from the junction point or apex are initially of slightly narrower width than the normal bead width $L_2$, with these legs 18 progressively rapidly widening as they project away from the junction point so as to again reach the normal bead width $L_2$.

To accomplish the desirable structural arrangement as described above and as illustrated in FIG. 2, the non-junction region 16, as it extends between the junctions 12 at opposite ends thereof, is straight, rather than following the normal arcuate configuration of the annular beads 10.

The operation of the embodiment will be described below.

The metallic gasket 12 is inserted between a cylinder head and a cylinder block of an internal combustion engine (not shown), and is fastened by a fastening bolt. Thus, each of the beads 10 is elastically deformed to form a seal line on a joint surface, thereby preventing the leakage of gas or oil.

The beads width $L_1$ at each of the junctions 12 of the adjacent beads 10 are approximately equal to the bead width $L_2$ at each of the non-junctions 14. Therefore, the spring constant of each of junctions 12 does not become smaller than the spring constant of each of the non-junctions 14. Thus, it is possible to prevent a reduction in sealing pressure at the junctions 12 and the leakage of gas or oil. Since non-uniform sealing pressure does not act upon the joint surfaces, it becomes unnecessary to cause an excessive fastening force to act upon the non-junctions 14 in order to ensure the sealing property of the junction 12. Therefore, it is possible to prevent the formation of cracks in the beads and hence to achieve effective sealing.

In the above description of the invention, a single metallic gasket has been mentioned by way of example. However, it will be appreciated that the present invention is applicable to a metallic gasket composed of a plurality of base plates or a laminated metallic gasket composed of layers of sub-plates.

As described previously, in accordance with the present invention, the bead width at each of the junctions of the adjacent beads are approximately equal to the bead width at each of the non-junctions. Therefore, the spring constant of each of the junctions does not become smaller than the spring constant of each of the non-junctions. Thus, it is possible to prevent a reduction in sealing pressure at the junctions and the leakage of gas or oil. Since non-uniform sealing pressure does not act upon the joint surfaces, it becomes unnecessary to cause an excessive fastening force to act upon the non-junctions in order to ensure the sealing property of the junction.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A metallic gasket comprising an elastic metallic plate having sealing beads formed thereon, the improvement in that said beads are formed on said elastic metallic plate so that the bead width at each junction at which one bead meets an adjacent bead is made approximately equal to the bead width at each non-junction.

2. In a metallic gasket for an internal combustion engine, said gasket comprising an elastic metallic plate having a pair of combustion chamber holes formed therethrough in spaced but adjacent relationship, said plate having annular sealing beads formed thereon in surrounding relationship to said holes, said sealing beads in the region between the adjacent combustion chamber holes being disposed so as to generally overlap, said beads sharing a common elongate bead portion which is disposed in the region between said adjacent combustion chamber holes, comprising the improvement wherein the common elongate bead portion at opposite ends joins to a pair of generally Y-shaped junctions which join to said pair of adjacent annular beads, said common elongate bead portion being generally straight and of uniform width, the width of said common bead portion adjacent the branching points of said Y-shaped junctions being substantially equal to the normal width of the annular beads as they extend around the respective combustion chamber holes.

3. A gasket according to claim 2, wherein each Y-shaped junction has a pair of legs which respectively join to the adjacent annular beads, each of said legs at the branching point being somewhat narrower than said normal width but progressively and rapidly increasing to said normal width as the legs project away from said branching point.

* * * * *